US008528924B1

(12) United States Patent
Bartel et al.

(10) Patent No.: US 8,528,924 B1
(45) Date of Patent: Sep. 10, 2013

(54) ROLLOVER PROTECTION SYSTEM

(75) Inventors: Harlan J. Bartel, Newton, KS (US); Brian L. Nebel, Hesston, KS (US)

(73) Assignee: Excel Industries, Inc., Hesston, KS (US)

( * ) Notice: Subject to any disclaimer, the term of this patent is extended or adjusted under 35 U.S.C. 154(b) by 228 days.

(21) Appl. No.: 12/945,277

(22) Filed: Nov. 12, 2010

Related U.S. Application Data (60) Provisional application No. 61/281,059, filed on Nov. 12, 2009.

(51) Int. Cl.
*B60R 21/13* (2006.01)

(52) U.S. Cl.
USPC ............... 280/156; 296/35.2; 296/190.03

(58) Field of Classification Search
USPC ............... 280/756; 296/190.03, 35.2
See application file for complete search history.

(56) References Cited

U.S. PATENT DOCUMENTS

| | | | |
|---|---|---|---|
| 4,666,183 A | 5/1987 | Azzarello | |
| 4,877,265 A | 10/1989 | DeBraal et al. | |
| 4,949,991 A | 8/1990 | Ludwig | |
| 5,042,835 A | 8/1991 | Burns | |
| 5,129,676 A | 7/1992 | Sheehan | |
| 5,503,430 A | 4/1996 | Miki et al. | |
| 5,779,272 A | 7/1998 | Panek et al. | |
| 5,839,758 A | 11/1998 | Finch | |
| 7,396,047 B1 | 7/2008 | Young | |
| 7,434,379 B2 | 10/2008 | Nogami et al. | |
| 7,568,732 B2 | 8/2009 | Schlup | |
| 2005/0212278 A1 | 9/2005 | Kurten | |
| 2005/0217232 A1 | 10/2005 | Asaharn et al. | |
| 2006/0001248 A1 | 1/2006 | Queveau et al. | |
| 2007/0290493 A1 | 12/2007 | David | |
| 2008/0309058 A1 | 12/2008 | Kurten | |

OTHER PUBLICATIONS

University of Tennessee, Knoxville, Powered Foldable ROPS, Senior Project, Document created on May 1, 2009. Unknown Publication Date.

*Primary Examiner* — Ruth Ilan (57) ABSTRACT

A rollover protection system unlocks and lowers from a raised position to a lowered position suitable for clearing a low hanging obstacle when an operator manually applies a force to an operator lever. The rollover protection system returns to the raised position when the operator ceases applying force to the operator lever.

6 Claims, 6 Drawing Sheets

ROLLOVER PROTECTION SYSTEM

RELATED APPLICATIONS

This application claims the benefit of U.S. Provisional Patent Application Ser. No. 61/281,059 filed on Nov. 12, 2009 which is incorporated herein by reference.

FIELD OF THE INVENTION

This invention relates to a rollover protection system which moves from a raised position to a lowered position suitable for clearing a low hanging obstacle.

BACKGROUND OF THE INVENTION

Numerous rollover protection systems may be found in the prior art. Various prior art rollover protection systems teach various ways for folding down, retracting or telescoping a top portion of a roll bar assembly usually in order to clear low hanging obstacles. Typically, the prior art teaches various types of joints that can be manually adjusted to lower the top portion of a roll bar assembly. A problem that arises when using prior art retractable rollover protection systems arises when an operator begins work in an area which includes low hanging obstacles. The potential exists for an operator to merely place the top portion of a roll bar assembly in a lowered position prior to working in such an area. If the same area also includes a sloped surface and the operator fails to return the top portion of the roll bar assembly to the raised position suitable for protecting the operator during a roll over, the operator will be exposed to a roll over hazard. What is needed is a rollover protection system wherein an operator may quickly and temporarily lower the top portion of a roll bar assembly to clear a low hanging obstacle and which automatically returns to a raised position when the operator is no longer acting to cause the top portion to be lowered. With such a rollover protection system, the top portion of the roll bar assembly would lower only as needed to clear low hanging obstacles and would otherwise remain in a raised position suitable for protecting the operator during a roll over.

BRIEF SUMMARY OF THE INVENTION

In order to overcome the above stated problems and limitations there is provided an improved rollover protection system for a vehicle which may be selectively lowered to clear low hanging obstacles. The improved rollover protection system includes a roll bar assembly and a lowering and raising mechanism. The roll bar assembly includes a bottom portion that is mounted to the vehicle frame and a top portion that is mounted to the bottom portion. The top portion is movably mounted to the bottom portion so that the top portion may move between a raised position and a lowered position. A lock is associated with the top portion and the bottom portion such that when the top portion is in the raised position, the lock secures the top portion sufficiently to the bottom portion so that the roll bar assembly will support the vehicle and protect the operator should the vehicle rollover.

The raising and lowering mechanism includes an operator lever. The operator lever may take the form of a handle, a foot pedal or any other movable element suitable for receiving a manually applied force from an operator. The raising and lowering mechanism is adapted so that when the operator of the vehicle applies sufficient force to the operator lever, the raising and lowering mechanism unlocks the top portion of the roll bar assembly and urges the top portion to move from the raised position to the lowered position. The raising and lowering mechanism is also adapted so that when the operator ceases applying force to the operator lever, the top portion moves from the lowered position to the raised position at which point the lock re-engages.

Accordingly, an operator using the improved rollover protection system may apply force to the operator lever to cause the top portion of the roll bar assembly to move to the lowered position to clear an low hanging obstacle. When the vehicle has cleared the low hanging obstacle, the operator can stop applying force to the operator lever thereby allowing the top portion of the roll bar assembly to return to the raised position where the lock re-engages to sufficiently secure the top portion in the raised position to protect the operator should the vehicle roll over.

DETAILED DESCRIPTION OF THE INVENTION

Figure 1:
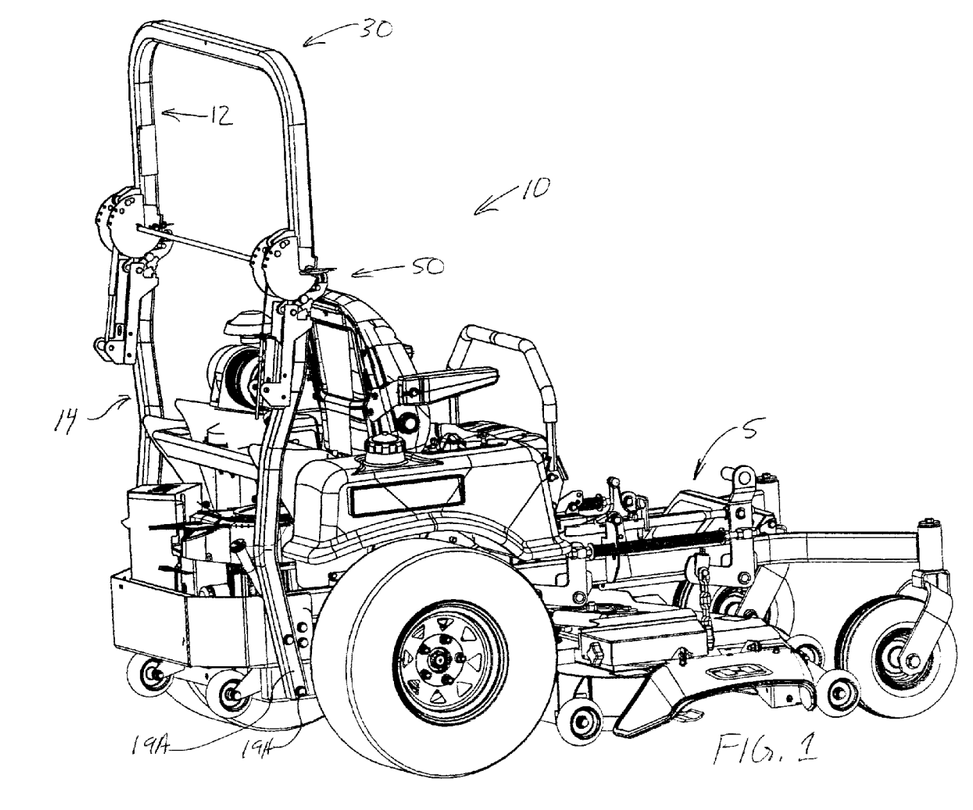
FIG. 1 is a perspective view of the improved rollover protection system installed on a vehicle.

Referring to the drawings, FIG. 1 shows an example embodiment of the improved rollover protection system 10 installed on vehicle 5. In this example, vehicle 5 may be any type of vehicle but will most typically be a riding lawn mower, tractor or other such vehicle which is likely to be exposed to a risk of a roll over. As can be seen in FIG. 1, improved rollover protection system 10 includes a roll bar assembly 12, a raising and lowering mechanism 50 and an operator lever assembly 50. Roll bar assembly includes a bottom portion 14 which is fixed to the frame of vehicle 5 and a top portion 30 which is pivotably mounted to bottom portion 14.

Figure 3:
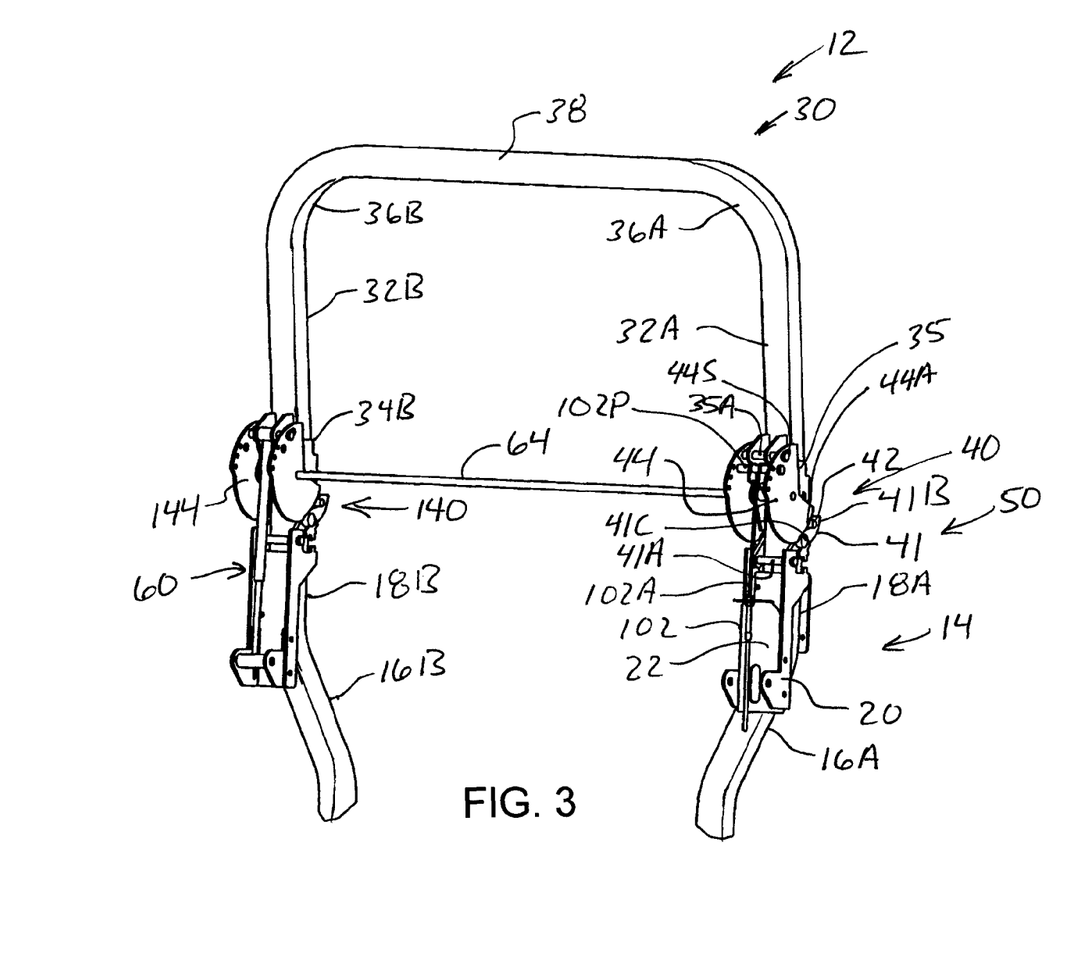
FIG. 3 is a perspective view of a roll bar assembly.

As can be best seen by referring to FIG. 3, bottom portion 14 of roll bar assembly 12, in this example, includes two spaced bottom members 16A and 16B. Each of the two spaced bottom members 16A and 16B have upper ends 18A and 18B respectively and lower ends 19A and 19B respectively where, in this example, may be found bolt holes 19H for receiving bolts (shown in FIG. 1) for fixing bottom members 16A and 16B to the frame of vehicle 5. As can be seen in FIG. 3, top portion 30 includes two side members 32A and 32B. Each side member 32A and 32B includes lower ends 34A and 34B respectively and upper ends 36A and 36B respectively. A top transverse member 38 connects between upper ends 36A and 36B to complete a rigid upside down U shaped top portion 30.

As can be best seen by referring to FIGS. 3-8, lower ends 34A and 34B of side members 32A and 32B are pivotably mounted to the upper end 18A and 18B of bottom members 16A and 16B respectively. The joints between the lower ends of side members 32A and 32B and the upper ends of bottom members 16A and 16B are adapted to allow top portion 30 to pivot counterclockwise as viewed in FIGS. 3-8 between the raised position shown in FIGS. 1, 3, 4, 5 and 6 to the lowered position shown in FIG. 8. In the alternative, relative movement between top portion 30 and bottom portion 12 as top portion 30 moves between the raised position and a lowered position could be accomplished by a translation such as with a telescoping structure or by a pivoting parallelogram structure or the like. The pivoting structure shown and described in this example is merely one way of accomplishing movement between a raised position and a lowered position. The remaining elements of the raising and lowering mechanism which will be described in greater detail below, are, out of necessity, adapted to function with a pivoting structure.

Figure 4:
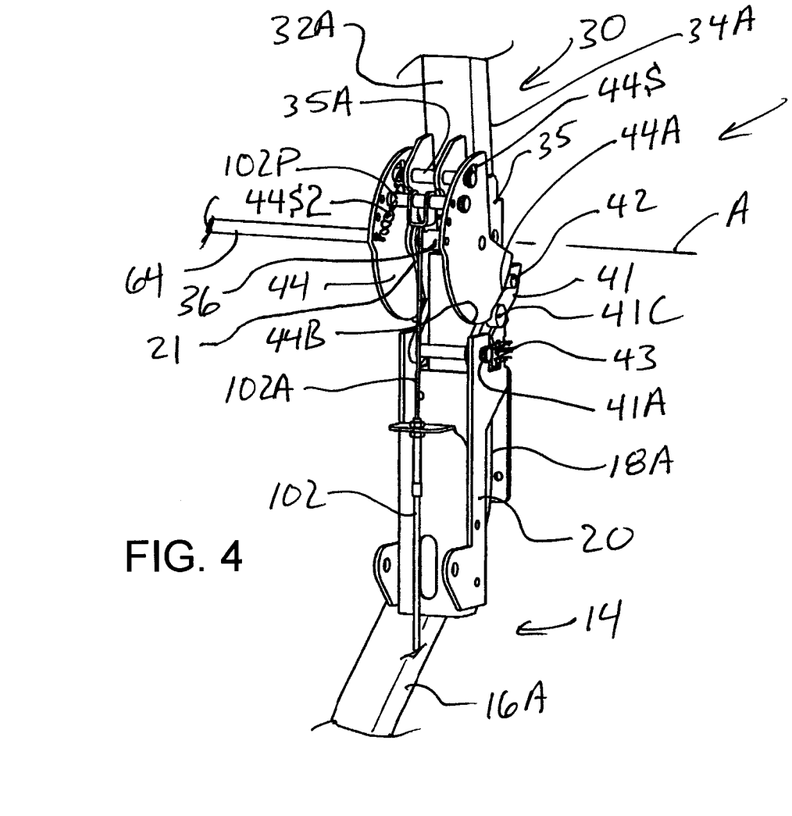
FIG. 4 is a close up perspective view of one side of the roll bar assembly shown in FIG. 3.

As can be seen in FIGS. 3-8, in this example, bottom portion 14 and top portion 30 include a lock which is biased to secure top portion 30 in the raised position when top portion 30 is in the raised position. As can be seen in FIGS. 4-8 by viewing only one side of roll bar assembly 12, the lock for securing top portion 30 in the raised position shown in FIG. 4 is a latch mechanism 40 which includes a latch member 41 which is pivotably mounted to a bracket 20 to pivot about a shaft 41A which is carried by bracket 20. Bracket 20 is fixed to upper end 18A of bottom member 16A. As can be best seen in FIG. 6, latch member 41 includes a notch 41B that is shaped to engage a rod 42. Rod 42 is generally horizontal and oriented transversely and is fixed to a bracket 35 that is fixed to the lower end 34A of side member 32A of top portion 30. Latch member 41 is biased by a spring 43 toward the latched position shown in FIGS. 4 and 5. Thus, latch member 41 is biased by spring 43 to secure top portion 30 in the raised position. Latch member 41 further presents a boss 41C. A cam 44 is rotatably mounted to a bracket 35 for rotation about an axis passing through the center of shaft 36 (shown in FIG. 4). Bracket 35 is fixed to the lower end 34A of side member 32A of top portion 30. Cam 44 engages boss 41C with two portions: a first recessed cam portion 44A and a second offset cam portion 44B. As a downward movement of cable 102 rotates cam 44 counterclockwise as viewed in FIGS. 3-8, boss 41C of latch member 41 is contacted by second offset cam portion 44B of cam 44 which has a larger radius than first recessed cam portion 44A. This urges latch member 41 out against spring 43 and disengages latch member 41 from rod 42. This unlatches top portion 30 from bottom portion 14 and makes it possible for top portion 30 to fold down relative to bottom portion 14. The skilled reader should understand that the same latch and cam mechanism is preferably identically repeated on the opposite side of roll bar assembly 14 between upper end 18B of bottom member 16B and the lower end 34B of side member 32B. The skilled reader should further consider that the latch mechanism described above is merely one way to provide a lock that is biased to lock top portion 30 in the raised position. A multitude of other mechanisms well known in the art, may be selected for providing such a biased lock that can be selectively disengaged to allow top portion 30 to move to a lowered position. Just one example of an alternate locking mechanism might include a spring biased pin which engages corresponding holes in bottom portion 14 and top portion 30 which align when top portion 30 is in the raised position. The spring biased pin could be connected to the raising and lowering mechanism such that it is urged against its spring bias to unlock top portion 30 when an operator applies a force to lower top portion 30.

Raising and lowering mechanism 50 includes an operator lever 100 and a spring assembly 60. Raising and lowering mechanism 50 functions in combination with an operator lever 100 to cause the lowering and raising of top portion 30.

Figure 5:
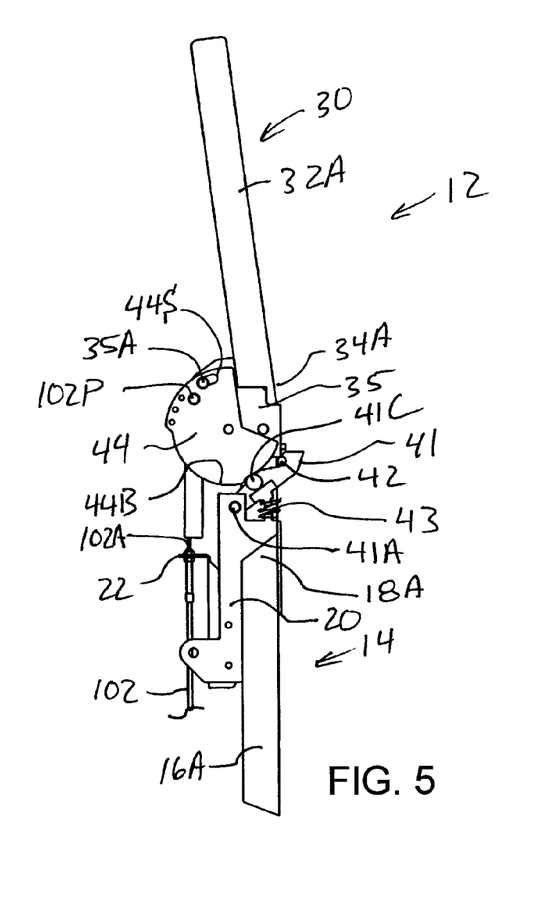
FIG. 5 is a close up side view of the roll bar assembly showing the top portion in the upright position with the lock engaged.
Figure 6:
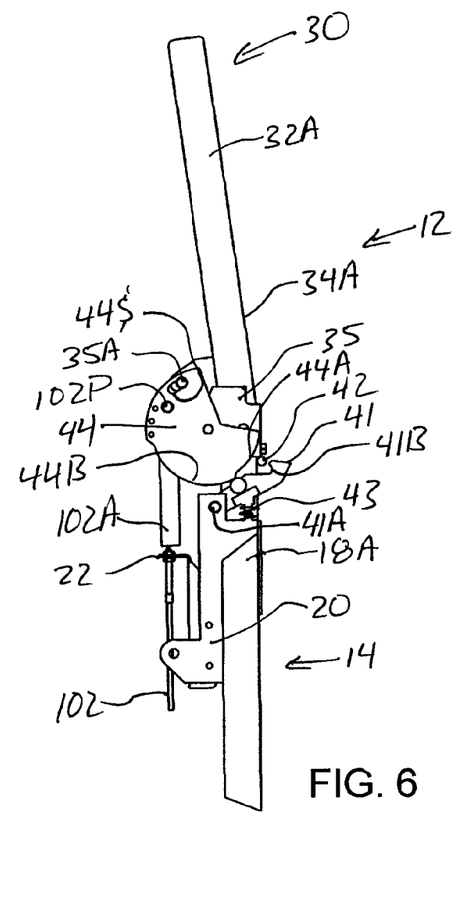
FIG. 6 is a close up side view of the roll bar assembly showing top portion in the upright position and with the lock disengaged.
Figure 7:
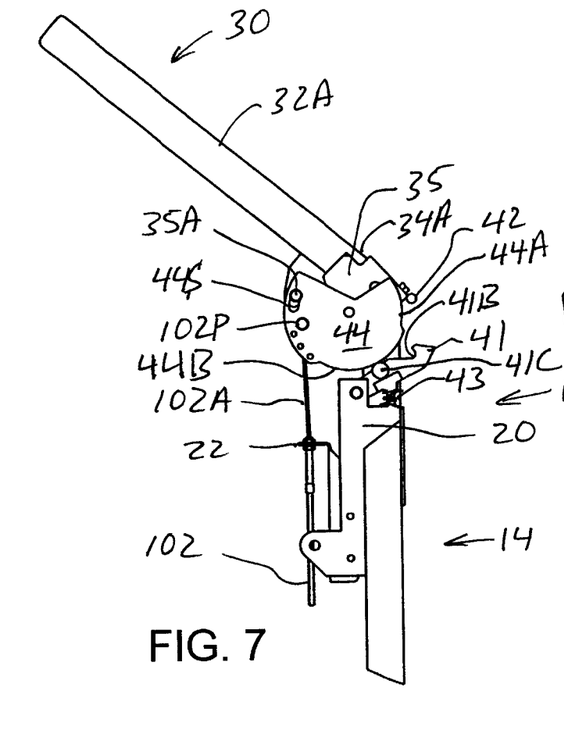
FIG. 7 is a close up side view of the roll bar assembly showing the top portion in a position which is between the raised position and the lowered position and showing the lock disengaged.
Figure 8:
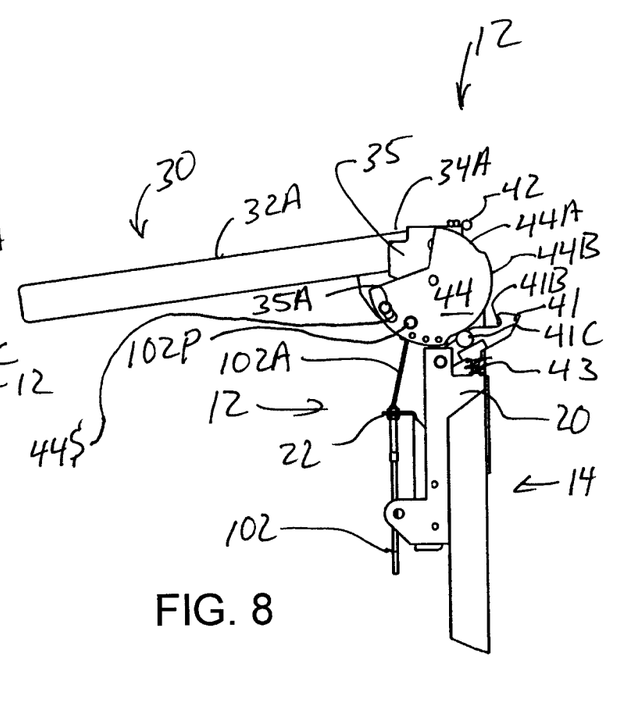
FIG. 8 is a close up side view of the roll bar assembly showing the top portion in the lowered position and the lock disengaged.

We will first consider how raising and lowering mechanism 50 functions to lower top portion 30 from the raised position to the lowered position. In this example operator lever 100, which may take the form of a handle or a pedal, is connected by cable 102 to cam 44. In this example, cable 102 connects to a sliding bracket 22 shown in FIGS. 3-8. An upper cable portion 102A connects between sliding bracket 22 and a pin 102P that is mounted to cam 44. As can be seen in FIG. 3, a shaft 64 extends between cam 44 and a cam 144 that is mounted to the opposite side of roll bar assembly 12. As can be seen in FIG. 4, cam 44 includes two opposite, identical plates that are located on opposite sides of upper end 18A of bottom member 16A. As can be seen in FIG. 3, the same arrangement exists for cam 144 on the opposite side for bottom member 16B. Shaft 64 is fixed to both side plates of cam 44 as well as both side plates of the cam 144 on the opposite side. Bracket 35 that is fixed to side member 32A presents ears on both sides of side member 32A which present co-axial bores for receiving shaft 64. A bracket 21 is fixed to the upper end 18A of side member 16A supports a bushing 36 that, in turn, also receives shaft 64. Thus cams 44, 144, shaft 64 and top portion 30 are all able to rotate about an axis A shown in FIG. 4. Axis A is fixed in relation to bottom portion 14. As can be seen in FIG. 4, bracket 35 mounted to side member 32A of top portion 30 includes a pin 35A which rides in a constant radius slot 44S. Also, a tension spring 44S2 connects between cam 44 and pin 35A that biases cam 44 clockwise toward pin 35A. Slot 44S, first recessed cam portion 44A and second offset cam portion 44B are arranged so that, as cable portion 102A pulls on cam 44, cam 44 rotates counterclockwise as second offset cam portion 44B rotates counterclockwise to encounter boss 41C of latch member 41. As is shown in FIG. 5, and as described above, this causes latch member 41 to release rod 42. Latch member 41 releases rod 42 before the clockwise end of slot 44S encounters pin 35A. Once the clockwise end of slot 44S of cam 44 encounters pin 35A, (which is fixed to bracket 35 which is, in turn, fixed to top portion 30) cam 44 ceases its rotation relative to bracket 35. Since latch mechanism 40 is now unlatched, cam 44, bracket 35 and top portion 30 are now free to rotate counterclockwise as seen in FIGS. 4-8 around the axis A (shown in FIG. 4) as cam 44 and bracket 35 are pulled by cable portion 102A. Top portion 30 continues to rotates until it reaches the lowered position shown in FIG. 8. if cable 102 and cable portion 102A continue to transmit sufficient force.

The operation described above occurs in reverse when the operator releases pressure from operator lever 100. As can be seen in FIG. 3, the opposite side of roll bar assembly 12 includes a spring assembly 60 that biases top portion 30 toward the raised position. Accordingly, when the operator releases pressure from operator lever 100, top portion 30 rotates from the lowered position shown in FIG. 7 back to the raised position shown in FIGS. 3 and 4 with the exception that slot 44S and pin 35A are in the relative positions shown in FIG. 4 during the return stroke so that latch member 41 is in the position shown in FIG. 4 before top portion 30 arrives in the position shown in FIG. 4. Accordingly, during the return stroke, pin 42A encounters a sloped upper surface of latch member 41 to cause latch member 41 to turn out to receive pin 42A. Also because spring 44S2 biases cam 44 clockwise, boss 41C of latch assembly 40 remains in contact with first recessed cam portion 44A thereby maintaining latch assembly 40 in the latched position.

Figure 2:
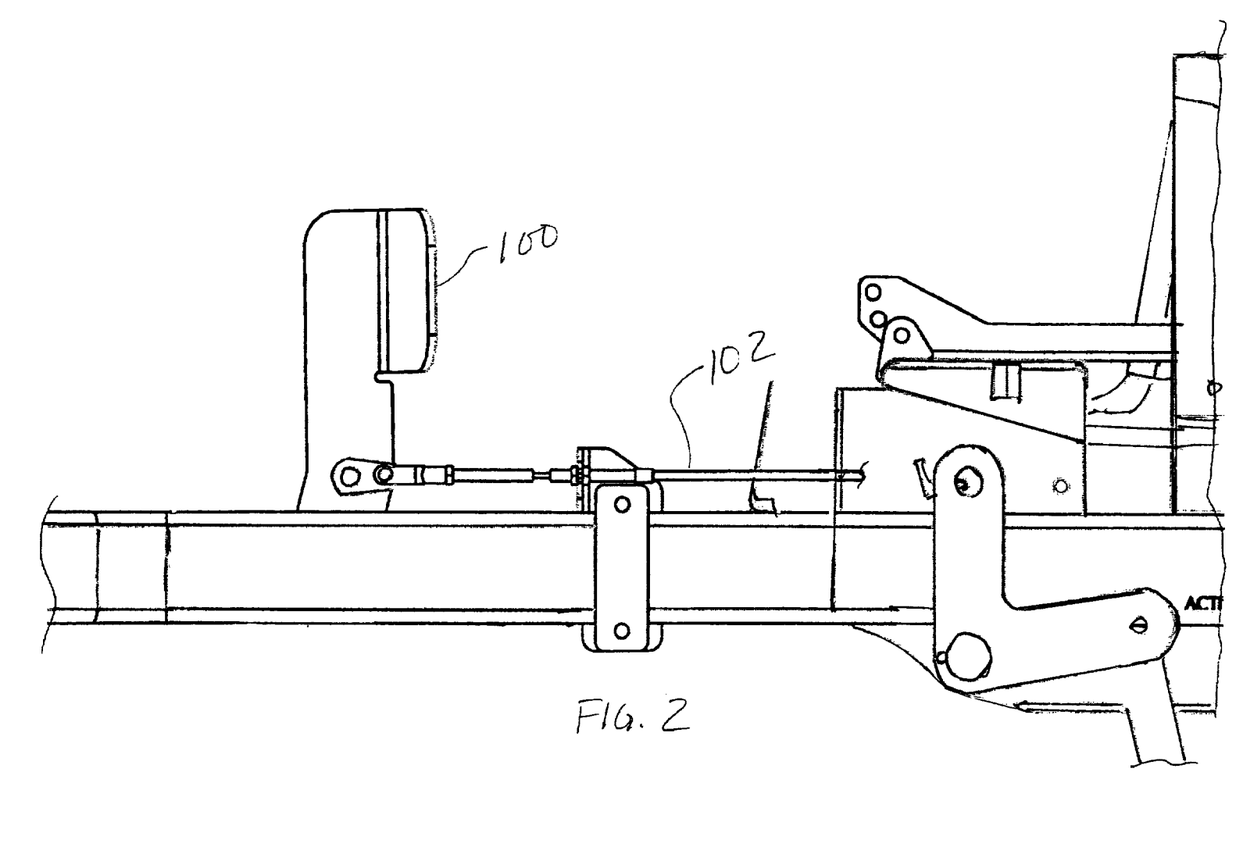
FIG. 2 is a side view showing an operator lever mounted to the vehicle.

Operator lever 100 is shown in FIG. 2 as a foot pedal but can also be a hand lever or other such member for receiving force from an operator. Operator lever 100 is connected to a cable 102. Lever 100 is biased in the position shown in FIG. 2 by tension which is applied by cable 102. Cable 102 routed to connect to sliding member 22 mounted to bracket 20 of roll bar assembly 12 shown in FIG. 3. Cable 102 is in tension because spring assembly 60 shown in FIG. 3 pushes cam 144 in a clockwise direction as seen in FIG. 3 which in turn applies a torque to shaft 64 which further pushes cam 44 in a clockwise direction to apply to an upper cable portion 102A which is connected to cable 102. When operator lever 100 is up as shown in FIG. 2, cable 102 is not pulling down on cam 44. When operator lever 100 is pressed forward by an operator, cable 102 pulls on cam 44 which rotates counterclockwise as seen from the perspective of FIG. 3 which causes the release of latch mechanism 40 and the lowering of top portion 30 as described above.

The skilled reader will appreciate that, for example, an actuator may be interposed between operator lever 100 and cam 44 so that the lowering and even the raising of top portion 30 may be powered in response to a switch which is activated by the rotation of lever 100. So, for example, in an embodiment having a powered actuator, lever 100 might close a switch for activating a powered actuator and might also be biased toward the position shown in FIG. 2, so that when the operator ceases applying a force to lever 100, the switch would open and the actuator would return top portion 30 to the raised position shown in FIGS. 1, 3 and 4. As is well known in the art, power may be supplied to an actuator in any one of a number of forms including, but by no means limited to, hydraulic power, electric power and pneumatic power.

The structures described above merely provide an example embodiment for accomplishing the objectives of the invention. To accomplish the objectives of the invention, it is essential that a top portion of a roll bar assembly unlock and move to a lowered position in response to an operator input such as applying force to an operator lever, and then return to a raised position when the operator is no longer supplying an input such as applying force to the operator lever.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A rollover protection apparatus, comprising:
   (a) roll bar assembly including a bottom portion that is mounted to a vehicle frame and a top portion that is moveably mounted to the bottom portion so that the top portion is operable to move between a raised position and a lowered position, the top portion of the roll bar assembly biased toward the raised position,
   (b) a lock associated with the top portion and the bottom portion operable to secure the top portion in the raised position, the lock movable between a locked position and an unlocked position and biased toward the locked position,
   (c) a raising and lowering mechanism associated with the roll bar assembly having an operator lever, the operator lever associated with the raising and lowering mechanism such that when an operator applies force to the operator lever, the raising and lowering mechanism unlocks the lock and moves the top portion from the raised position to the lowered position, the raising and lowering mechanism also arranged such that when the operator ceases applying force to the operator lever, the top portion moves from the lowered position to the raised position and the lock moves to the locked position, whereby, an operator using the rollover protection apparatus may apply force to the operator lever to cause the top portion of the roll bar assembly to move to the lowered position to clear a low hanging obstacle and whereby, when the vehicle has cleared the low hanging obstacle, the operator stops applying force to the operator lever thereby allowing the top portion of the roll bar assembly to return to the raised position and the lock to re-engage thereby securing the top portion in the raised position.

2. The rollover protection apparatus of claim 1, wherein:
the top portion of the roll bar assembly is pivotably mounted to the bottom portion of the roll bar assembly.

3. The rollover protection apparatus of claim 1, wherein:
   (a) the lever is movable between a first position, a second position and a third position, and,
   (b) the lever and the mechanism are arranged such that;
      (i) if an operator moves the lever from the first position to the second position the mechanism moves the lock to the unlocked position,
      (ii) if an operator moves the lever from the second position to the third position, the mechanism moves the upper portion of the roll bar assembly from the raised position to the lowered position, and,
      (iii) if an operator stops pushing on the lever when the lever is in the third position, the upper portion of the roll bar assembly moves from the lowered position to the raised position and the lock moves to the locked position to secure the upper portion of the roll bar assembly in the raised position and the lever returns to the first position.

4. The rollover protection apparatus of claim 1, wherein:
   (a) the top portion of the roll bar assembly is pivotably mounted to the bottom portion of the roll bar assembly,
   (b) the lever is movable between a first position, a second position and a third position, and,
   (c) the lever and the mechanism are arranged such that;
      (i) if an operator moves the lever from the first position to the second position the mechanism moves the lock to the unlocked position,
      (ii) if an operator moves the lever from the second position to the third position, the mechanism moves the upper portion of the roll bar assembly from the raised position to the lowered position, and,
      (iii) if an operator stops pushing on the lever when the lever is in the third position, the upper portion of the roll bar assembly moves from the lowered position to the raised position and the lock moves to the locked position to secure the upper portion of the roll bar assembly in the raised position and the lever returns to the first position.

5. The rollover protection system of claim 1, wherein:
the operator lever is a foot pedal.

6. The rollover protection system of claim 1, wherein:
the mechanism includes at least one powered actuator and the operator lever is replaced by an input device for receiving a force from an operator and the mechanism is arranged such that when the operator continuously applies a force to the input device, the mechanism releases the lock and the actuator rotates the top portion of the roll bar assembly from the raised position to the lowered position and the mechanism is further arranged such that when the operator stops applying the force to the input device, the top portion of the roll bar assembly returns to the raised position and the lock secures the top portion of the roll bar assembly in the raised position.

* * * * *